(12) United States Patent
Watanabe

(10) Patent No.: US 10,588,073 B2
(45) Date of Patent: Mar. 10, 2020

(54) COMMUNICATION APPARATUS, COMMUNICATION METHOD, AND NON-TRANSITORY COMPUTER-READABLE MEDIUM

(71) Applicant: CANON KABUSHIKI KAISHA, Tokyo (JP)

(72) Inventor: Tokiko Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/048,517

(22) Filed: Jul. 30, 2018

(65) Prior Publication Data
US 2019/0053137 A1 Feb. 14, 2019

(30) Foreign Application Priority Data
Aug. 9, 2017 (JP) .................... 2017-154733

(51) Int. Cl.
*H04W 48/16* (2009.01)
*H04W 40/24* (2009.01)
(Continued)

(52) U.S. Cl.
CPC ......... *H04W 48/16* (2013.01); *H04W 40/244* (2013.01); *H04W 28/0231* (2013.01);
(Continued)

(58) Field of Classification Search
CPC ..... H04W 48/16; H04W 92/20; H04W 48/20; H04W 40/244
See application file for complete search history.

(56) References Cited

U.S. PATENT DOCUMENTS

| | | | |
|---|---|---|---|
| 9,801,069 B2 | 10/2017 | Shibata | |
| 2008/0207130 A1* | 8/2008 | Kunii | H04B 17/0085 455/62 |

(Continued)

FOREIGN PATENT DOCUMENTS

| | | |
|---|---|---|
| JP | 2011049701 A | 3/2011 |
| JP | 2011139238 A | 7/2011 |

(Continued)

OTHER PUBLICATIONS

Canon, Method for connecting printer and access point (wireless connection) PIXUS MG8230/MG6230, https://cweb.canon.jp/e-support/faq/answer/inkjetmfp/65487-1.html, dated Jan. 21, 2013, Document No. Q000065487, Section 5, Step 4-9, retrieved Aug. 17, 2018.

(Continued)

*Primary Examiner* — Muthuswamy G Manoharan
(74) *Attorney, Agent, or Firm* — Venable LLP

(57) ABSTRACT

A wireless communication apparatus comprises: a search unit that searches, by using a plurality of frequency bandwidths, for an access point to perform wireless communication; a display unit that displays, based on pieces of predetermined information corresponding to a plurality of access points detected by a search, display items corresponding to the pieces of predetermined information; and a processing unit that performs, when the display items are displayed and a user selects one of the display items, connection processing to an access point specified by the selection of the display item, wherein when a display item corresponding to a first access point and a second access point is selected, the processing unit performs the connection processing to an access point that satisfies a predetermined condition, among the first access point and the second access point.

20 Claims, 16 Drawing Sheets

(51) Int. Cl.
 *H04W 92/20* (2009.01)
 *H04W 48/20* (2009.01)
 *H04W 28/02* (2009.01)
 *H04W 84/12* (2009.01)

(52) U.S. Cl.
 CPC ............ *H04W 48/20* (2013.01); *H04W 84/12* (2013.01); *H04W 92/20* (2013.01)

(56) References Cited

U.S. PATENT DOCUMENTS

| | | | | |
|---|---|---|---|---|
| 2009/0195827 | A1* | 8/2009 | Kimura | H04W 72/082 358/1.15 |
| 2010/0110921 | A1* | 5/2010 | Famolari | H04W 48/17 370/252 |
| 2015/0077798 | A1* | 3/2015 | Ren | G06F 3/1236 358/1.15 |
| 2016/0007200 | A1* | 1/2016 | Shibata | H04W 76/10 713/168 |
| 2016/0095146 | A1* | 3/2016 | Ren | H04W 76/14 370/329 |
| 2016/0291851 | A1* | 10/2016 | Tomono | G06F 3/04845 |
| 2017/0353374 | A1* | 12/2017 | Shatil | H04L 43/0811 |

FOREIGN PATENT DOCUMENTS

| | | |
|---|---|---|
| JP | 2013131956 A | 7/2013 |
| JP | 2014007506 A | 1/2014 |
| JP | 2014127831 A | 7/2014 |
| JP | 2016019085 A | 2/2016 |

OTHER PUBLICATIONS

Canon, Method for making a wireless LAN (Wi-Fi) connected with manual setting (MG8230/MG6230), https://cweb.canon.jp/pls/webcc/WC_SHOW_CONTENTS.EdtDsp?i_tx_contents_dir=/e-support/faq/answer/inkjetmfp/&i_tx_contents_file=63901-1.html, dated Dec. 2016, retrieved Aug. 17, 2018.

Japanese Office Action issued in corresponding Japanese Application No. 2017154733 dated Aug. 27, 2018.

* cited by examiner

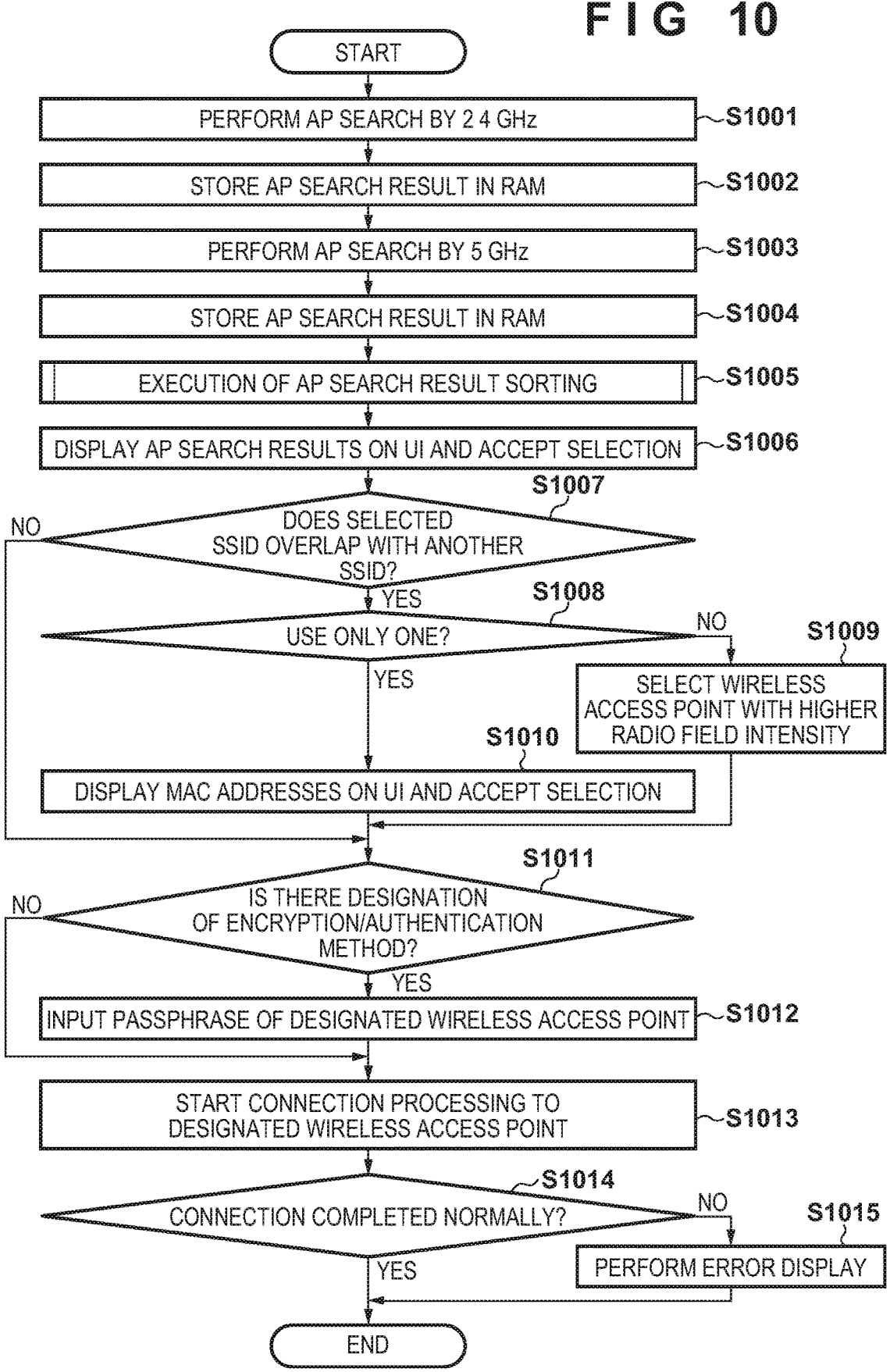

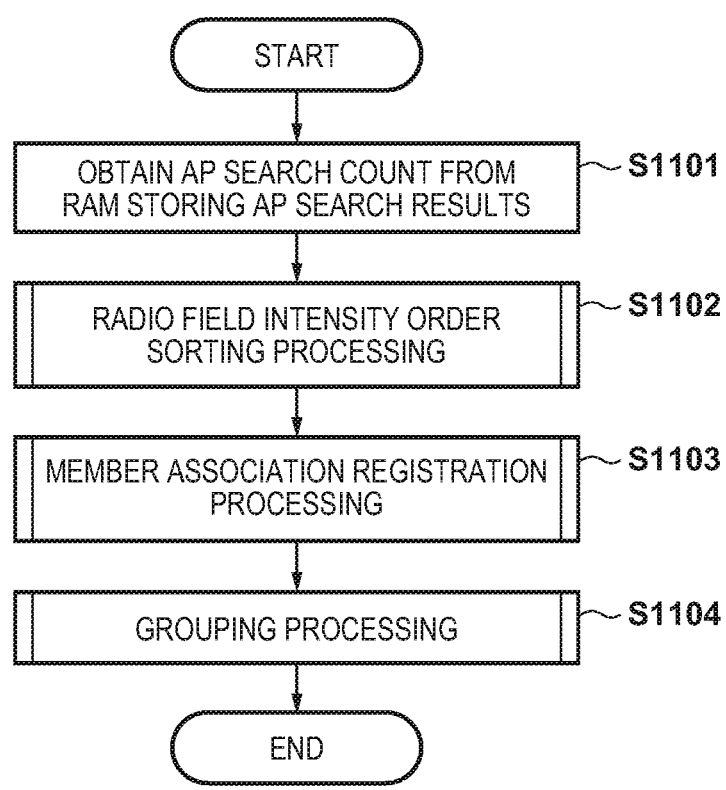

FIG. 15

| No | SSID | FREQUENCY BANDWIDTH | AUTHENTICATION METHOD | ENCRYPTION METHOD | MAC ADDRESS | RADIO FIELD INTENSITY |
|---|---|---|---|---|---|---|
| 1 | abcde | 2.4GHz | OPEN | WEP64 | 36:aa:89:bb:60:11 | 60 |
| 2 | aabbccdd | 2.4GHz | OPEN | WEP128 | 48:33:90:ae:51:12 | 80 |
| 3 | bbaacc33 | 2.4GHz | WPA2-PSK | TKIP | 50:35:70:aa:44:bb | 40 |
| 4 | pppooo | 2.4GHz | WPA2-PSK | AES | 33:50:80:bb:15:10 | 55 |
| 5 | nnmmm | 5GHz | OPEN | WEP64 | 12:34:56:78:90:ab | 50 |
| 6 | abcde | 5GHz | OPEN | WEP128 | 34:34:56:90:90:ab | 75 |
| 7 | 234hhhii | 5GHz | WPA2-PSK | TKIP | aa:38:77:aa:55:bb | 65 |
| 8 | abcde | 5GHz | WPA2-PSK | AES | 12:34:56:78:90:ab | 90 |
| 9 | bbbbbb | 2.4GHz | WPA2-PSK | AES | 56:aa:44:60:bb:11 | 65 |
| 10 | aaaaaaaa | 5GHz | WPA2-PSK | AES | 60:33:bb:70:aa:22 | 70 |

FIG. 16

| No | SSID | FREQUENCY BANDWIDTH | AUTHENTICATION METHOD | ENCRYPTION METHOD | MAC ADDRESS | RADIO FIELD INTENSITY |
|---|---|---|---|---|---|---|
| 8 | abcde | 5GHz | WPA2-PSK | AES | 12:34:56:78:90:ab | 90 |
| 2 | aabbccdd | 2.4GHz | OPEN | WEP128 | 48:33:90:ae:51:12 | 80 |
| 6 | abcde | 5GHz | OPEN | WEP128 | 34:34:56:90:90:ab | 75 |
| 10 | aaaaaaaa | 5GHz | WPA2-PSK | AES | 60:33:bb:70:aa:22 | 70 |
| 7 | 234hhii | 5GHz | WPA2-PSK | TKIP | aa:38:77:aa:55:bb | 65 |
| 9 | bbbbbb | 2.4GHz | WPA2-PSK | AES | 56:aa:44:60:bb:11 | 65 |
| 1 | abcde | 2.4GHz | OPEN | WEP64 | 36:aa:89:bb:60:11 | 60 |
| 4 | pppooo | 2.4GHz | WPA2-PSK | AES | 33:50:80:bb:15:10 | 55 |
| 5 | nnmmm | 5GHz | OPEN | WEP64 | 12:34:56:78:90:ab | 50 |
| 3 | bbaacc33 | 2.4GHz | WPA2-PSK | TKIP | 50:35:70:aa:44:bb | 40 |

COMMUNICATION APPARATUS, COMMUNICATION METHOD, AND NON-TRANSITORY COMPUTER-READABLE MEDIUM

BACKGROUND OF THE INVENTION

Field of the Invention

The present invention relates to a communication apparatus, a communication method, and a non-transitory computer-readable medium.

Description of the Related Art

In recent years, a wireless LAN system has become very popular due to improvement in the transmission speed of a wireless communication section, the spread of wireless communication apparatuses, and the like. In particular, as a wireless LAN system that uses frequency bandwidths of 2.4 GHz and 5 GHz, a wireless LAN system defined by the IEEE802.11 series has become popular in general. In addition, as a wireless access point which is essential to the construction of a network system, products which are capable of concurrently controlling and managing connections by both 2.4-GHz and 5-GHz frequency bandwidths have become mainstream.

On the other hand, as a device that participates in a network system, a product that supports communication by selecting one frequency bandwidth and switching to the selected frequency bandwidth is generally used. Here, for example, among access points which use a plurality of frequency bandwidths such as 2.4 GHz and 5 GHz, the identification names (SSIDs: Service Set Identifiers) of the access points corresponding to the respective frequency bands may be the same or similar to each other. In addition, for example, at a large site such as a school, the access points may be set with the same identification name (SSID) so that a user can connect to the wireless LAN system of the school wherever he/she may move. Even in this case, it is desirable for a communication apparatus to select a suitable wireless network to connect to without the user having to be concerned with the frequency bandwidth to be used.

Japanese Patent Laid-Open No. 2016-019085 discloses a technique of suitably selecting, in a state in which a construction of a wireless LAN system is to be generally performed, a wireless network in which a communication apparatus is to participate from a plurality of wireless networks formed by a plurality of access points. In Japanese Patent Laid-Open No. 2016-019085, a communication apparatus receives a wireless profile from each neighboring access point and connects to an access point which supports an authentication method or an encryption method with a comparatively high security level among the neighboring access points.

Even if the security between apparatuses have been considered as disclosed in Japanese Patent Laid-Open No. 2016-019085, there may be a case in which a connection to an apparatus which is actually far away from the communication apparatus is unwantedly prioritized. For example, in a case in which a plurality of access points that have the same name or similar SSIDs are present, assume that there is a later-added access point which has a high security level and is arranged in a faraway location. In this case, for example, even if the user wants to prioritize the radio field intensity, the apparatus may be problematically connected to the faraway access point.

SUMMARY OF THE INVENTION

In the present invention, it is possible to suitably decide a connection-destination wireless access point in accordance with the radio field intensity when a plurality of wireless access points can be used.

According to one aspect of the present invention, there is provided a wireless communication apparatus capable of wireless communication, comprising: a search unit configured to search, by using a plurality of frequency bandwidths, for an access point to perform wireless communication; a display unit configured to display, based on pieces of predetermined information corresponding to a plurality of access points detected by a search by the search unit and obtained from the search, display items corresponding to the pieces of predetermined information on a display device; and a processing unit configured to perform, when the plurality of display items are displayed by the display unit and a user selects one of the plurality of display items, connection processing to an access point specified by the selection of the display item, wherein when a display item corresponding to a first access point and a second access point is selected by the user, the processing unit performs the connection processing to an access point that satisfies a predetermined condition based on pieces of information related to communication quality of the wireless communication, among the first access point and the second access point.

According to another aspect of the present invention, there is provided a communication method of a communication apparatus capable of wireless communication, the method comprising: searching, by using a plurality of frequency bandwidths, for an access point to perform wireless communication; displaying, based on pieces of predetermined information corresponding to a plurality of access points detected by a search in the searching and obtained from the search, display items corresponding to the pieces of predetermined information on a display device; and performing, when the plurality of display items are displayed in the displaying and a user selects one of the plurality of display items, connection processing to an access point specified by the selection of the display item, wherein when a display item corresponding to a first access point and a second access point is selected by the user, the connection processing is performed to an access point that satisfies a predetermined condition based on pieces of information related to communication quality of the wireless communication, among the first access point and the second access point.

According to another aspect of the present invention, there is provided a non-transitory computer-readable medium storing a program to cause a computer capable of wireless communication to function as a search unit configured to search, by using a plurality of frequency bandwidths, for an access point to perform wireless communication; a display unit configured to display, based on pieces of predetermined information corresponding to a plurality of access points detected by a search by the search unit and obtained from the search, display items corresponding to the pieces of predetermined information on a display device; and a processing unit configured to perform, when the plurality of display items are displayed by the display unit and a user selects one of the plurality of display items, connection processing to an access point specified by the selection of the display item, wherein when a display item corresponding to a first access point and a second access point is selected by the user, the processing unit performs the connection processing to an access point that satisfies a predetermined condition based on pieces of information related to communication quality of the wireless communication, among the first access point and the second access point.

By the present invention, it is possible to suitably decide a connection-destination access point in accordance with the radio field intensity when a plurality of wireless access points can be used.

Further features of the present invention will become apparent from the following description of exemplary embodiments (with reference to the attached drawings).

BRIEF DESCRIPTION OF THE DRAWINGS

FIG. 10 is a flowchart of the wireless LAN setup according to the present invention;

FIG. 11 is a flowchart of wireless access point search result sorting processing according to the present invention;

FIG. 15 is a table showing an example of a wireless access point search result according to the present invention;

FIG. 16 is a table showing an example in which the wireless access point search results have been sorted in accordance with the radio field intensity according to the present invention.

DESCRIPTION OF THE EMBODIMENTS

Embodiments of the present invention will be described in detail hereinafter with reference to the accompanying drawings. It should be noted that the relative arrangement of components, the display screens, and the like set forth in the embodiments do not limit the scope of the present invention unless it is specifically stated otherwise.

System Arrangement

A system arrangement for implementing each embodiment to be described below will be described first with reference to FIGS. 1 to 6.

Figure 1:
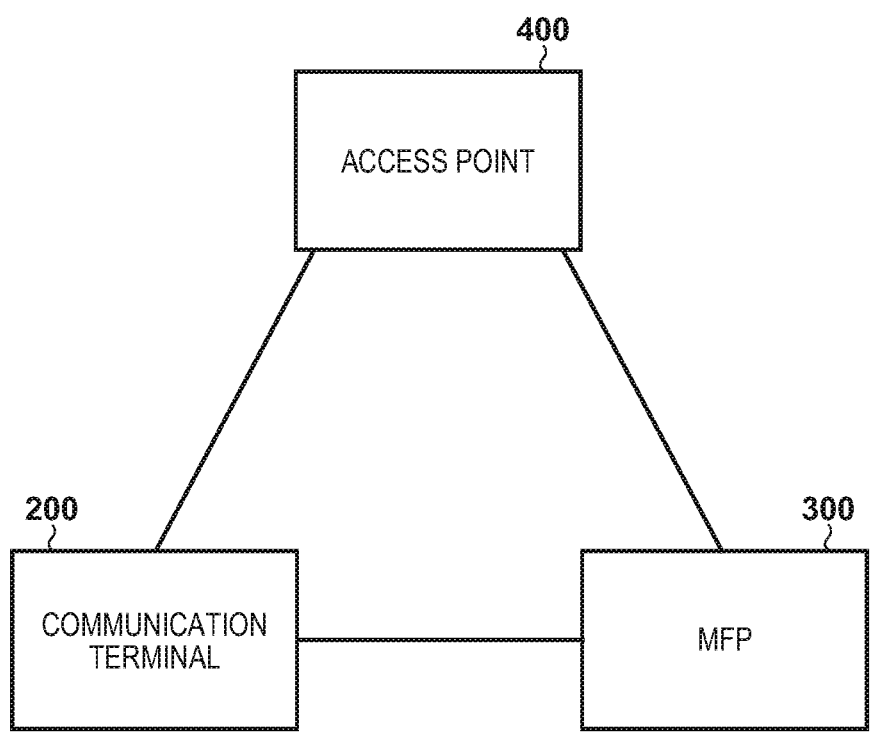
FIG. 1 is a block diagram showing an example of a system arrangement according to the present invention.

FIG. 1 is a view showing an example of the system arrangement of a mobile communication terminal apparatus (to be referred to as a communication terminal hereinafter), a printing apparatus (to be referred to as an MFP hereinafter), and a wireless access point (to be referred to as an access point hereinafter). A communication terminal 200 is an apparatus that includes a wireless LAN (WLAN) communication unit. The communication terminal 200 may be a personal information terminal such as a PDA (Personal Digital Assistant), a mobile phone, a digital camera, a personal computer, or the like. An MFP 300 suffices to be capable of performing wireless communication with the communication terminal 200 and an access point 400, and may additionally have a reading function (scanner), a FAX function, and a telephone function. In this embodiment, an MFP (Multi-Function Printer) that has a reading function and a printing function will be exemplified as a printing apparatus. Although this embodiment uses a printing apparatus as an example of an apparatus that communicates with the access point 400 and the communication terminal 200, the present invention is not limited to this, and another apparatus may be used. The access point 400 includes a WLAN communication unit and provides infrastructure mode communication by relaying the communication between apparatuses that have been permitted to connect to the access point.

The communication terminal 200 and the MFP 300 execute, by their respective WLAN communication units, wireless communication via the access point 400 by the infrastructure mode. Note that the communication terminal 200 and the MFP 300 can execute processing operations corresponding to a plurality of print services via the WLAN.

Figure 2:
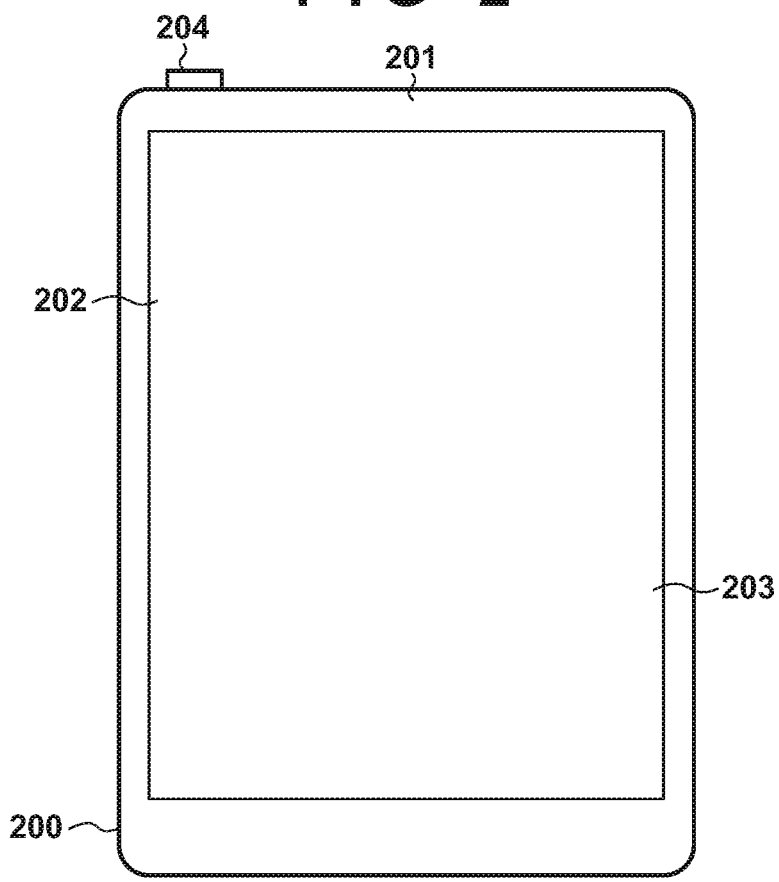
FIG. 2 is a view showing the outer appearance of a communication terminal according to the present invention.

FIG. 2 is a view showing an example of the outer appearance of the communication terminal 200. A smartphone is used to exemplify the communication terminal 200 in this embodiment. A smartphone corresponds to a multi-function mobile phone incorporating, other than a telephone function, a camera, a Web browser, an electronic mail function, and the like.

A WLAN unit 201 is a unit for performing communication by WLAN. The WLAN unit 201 can perform, for example, data (packet) communication in a WLAN system in compliance with the IEEE802.11 series. In addition, communication based on Wi-Fi Direct (WFD), communication by a software AP mode or the infrastructure mode, and the like can be performed in the wireless communication using the WLAN unit 201. It will be assumed that these communication modes are implemented by conventional techniques, and a detailed explanation will be omitted.

A display unit 202 is, for example, a display including an LCD display mechanism. An operation unit 203 includes a touch panel operation mechanism and detects an operation by a user. As a representative operation method, there is a method of displaying a button icon or a software keyboard by the display unit 202 and detecting an operation event when these parts are touched by the user. A power key 204 is a hard key which is used to turn on or off a power supply.

Figure 3:
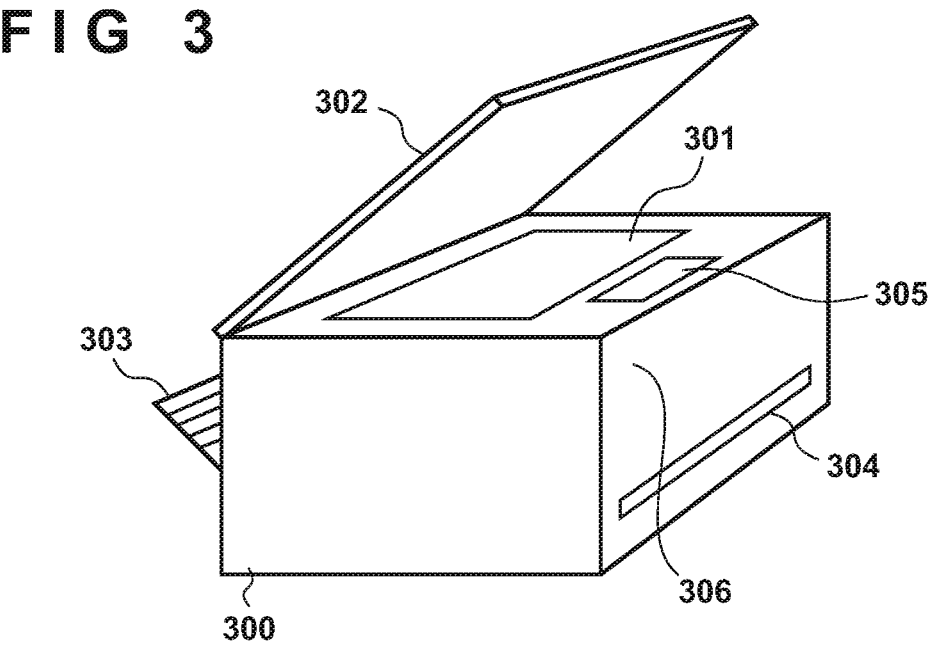
FIG. 3 is a view showing the outer appearance of an MFP according to the present invention.

FIG. 3 is a view showing an example of the outer appearance of the MFP 300. In FIG. 3, a document table 301 is a clear glass table on which a document that is to be read by a scanner (reading unit) is placed. A document cover 302 is a cover for holding the document when reading is to be performed by the scanner and for preventing the external leakage of the light from a light source that irradiates the document when the document is read. A print sheet insertion port 303 is an insertion port in which various sizes of sheets can be set. Sheets set in the print sheet insertion port 303 are conveyed sheet by sheet to a print unit and discharged from a print sheet discharge port 304 after undergoing printing in the print unit. An operation display unit 305 is formed from an LED (light emitting diode), an LCD (liquid crystal display), and keys such as character input keys, curser keys, an enter key, a cancel key, and the like. The operation display unit may also be formed by a touch panel. A WLAN antenna 306 is embedded with an antenna for WLAN communication.

Figure 4A:
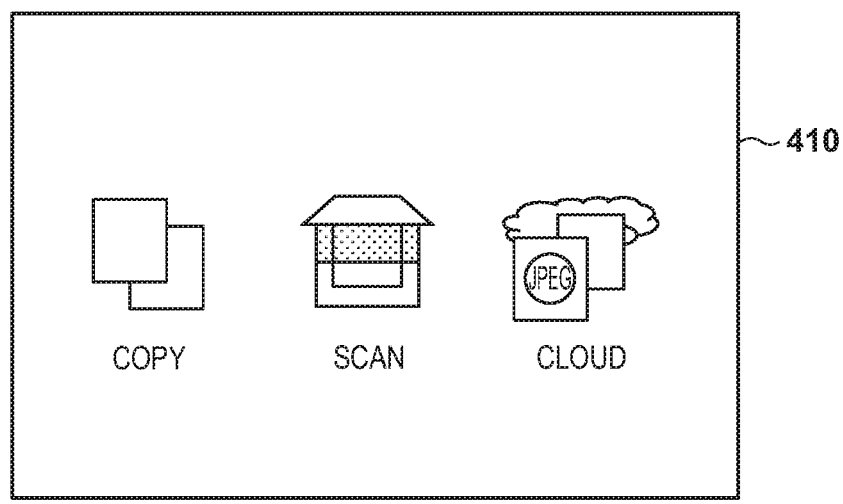
FIGS. 4A, 4B, and 4C are views each showing an example of a display screen of an operation display unit of the MFP according to the present invention.
Figure 4B:
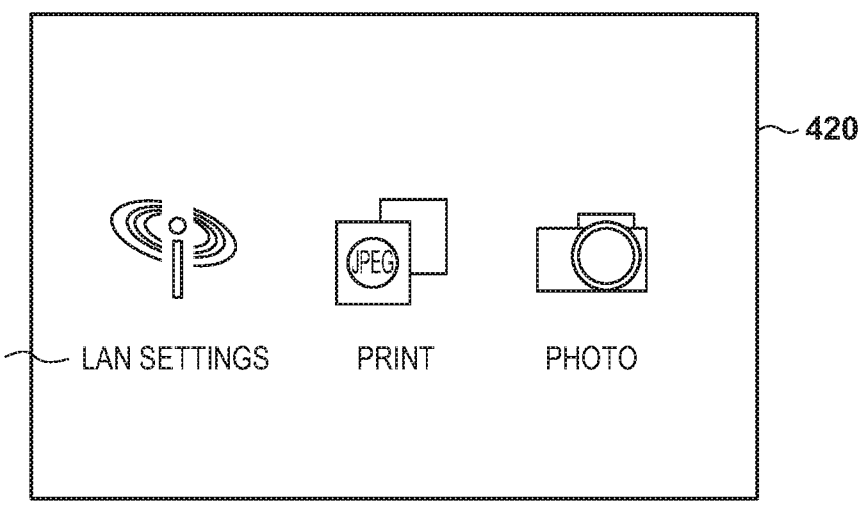
Figure 4C:
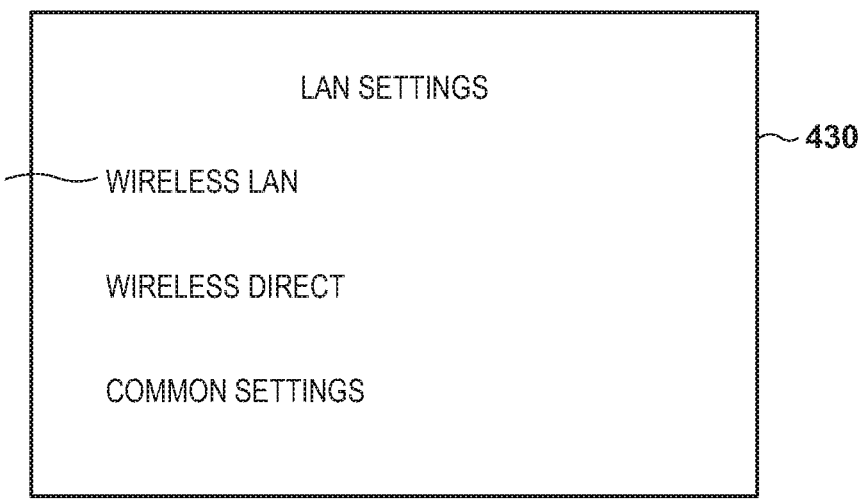

FIGS. 4A to 4C are views each schematically showing an example of screen display of the operation display unit 305 of the MFP 300. FIG. 4A is an example of the arrangement of a home screen 410 showing a state (an idle state) in which the MFP 300 is powered on and an operation such as printing or scanning is not performed. Copy, scan, menu display and various settings of cloud functions using Internet communication, and function execution can be made by key operations and touch panel operations from this home screen 410. A function different from that displayed on the home screen 410 can be seamlessly displayed by key operations and touch panel operations from the home screen 410 shown in FIG. 4A.

FIG. 4B is an example of a screen for displaying various kinds of functions, and shows an example of the arrangement of a screen 420 from which a print function, a photo function, and changes to the LAN settings can be executed. FIG. 4C shows an example of the arrangement of a screen 430 that is displayed when LAN settings 421 are selected on the screen 420. Changes to various kinds of LAN settings such as an enable/disable setting of the infrastructure mode, an enable/disable setting of the WFD mode, and the like can be executed from the screen 430.

Figure 5:
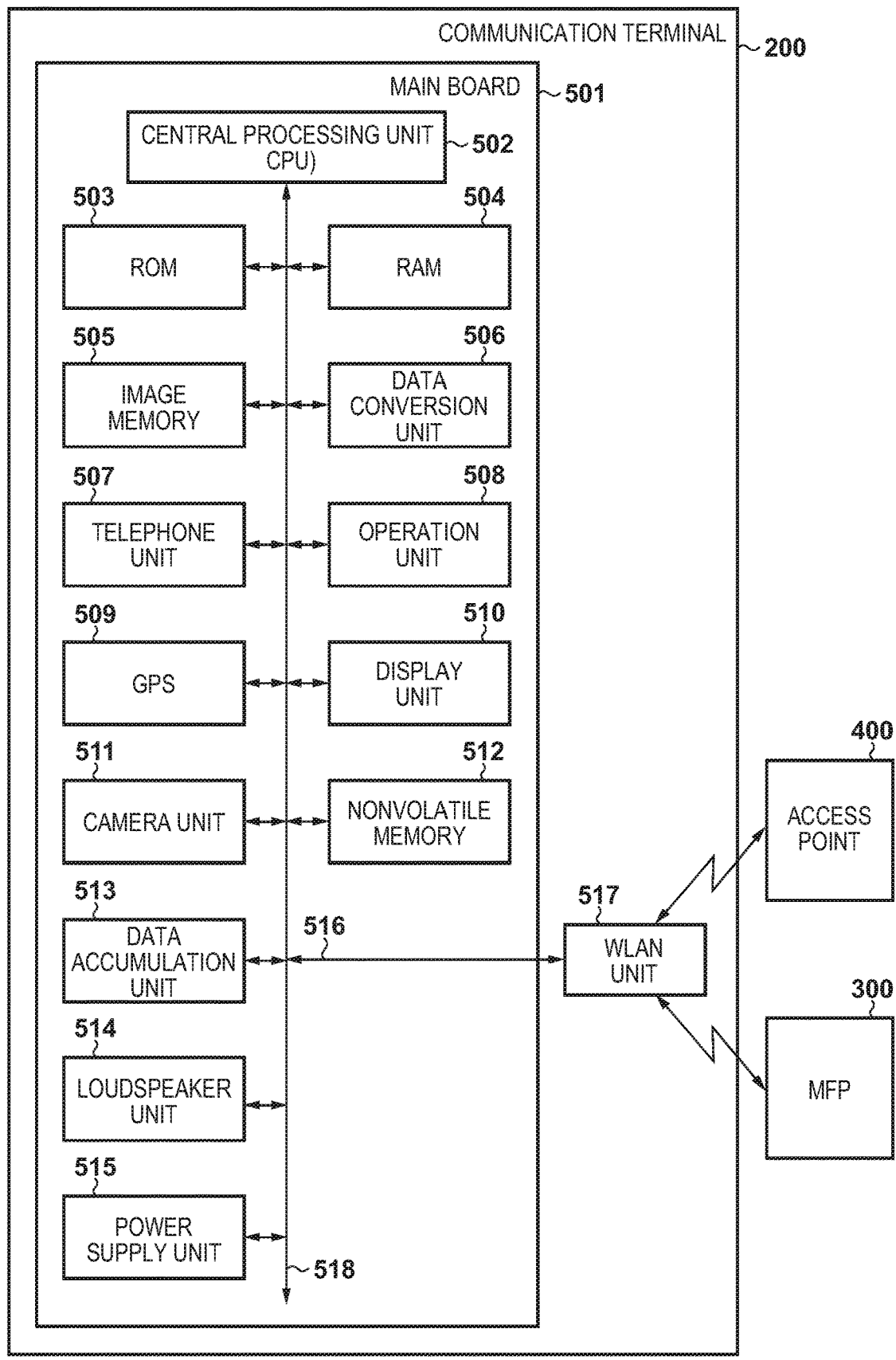
FIG. 5 is a block diagram showing an example of the arrangement of the communication terminal according to the present invention.

FIG. 5 is a block diagram showing an example of the arrangement of the communication terminal 200. The communication terminal 200 includes a main board 501 that executes the main control of the apparatus itself and a WLAN unit 517 that performs WLAN communication.

In the main board 501, a CPU (Central Processing Unit) 502 is a system control unit and controls the overall communication terminal 200. The various kinds of processing operations of the communication terminal 200 are executed under the control of the CPU 502. A ROM 503 stores control programs to be executed by the CPU 502, an embedded operating system (OS) program, and the like. In this embodiment, each control program stored in the ROM 503 performs software control such as scheduling, task switching, and the like under the management of the embedded OS stored in the ROM 503.

A RAM 504 is formed from an SRAM (Static RAM) or the like, stores data such as program control variables, stores data such as setting values registered by the user and management data of the communication terminal 200, and is allocated with various kinds of work buffer areas. An image memory 505 is formed from a memory such as a DRAM (Dynamic RAM) and temporarily stores the image data received via the WLAN unit 517 and the image data read out from a data accumulation unit 513 to perform processing by the CPU 502.

A nonvolatile memory 512 is formed from a memory such as a flash memory or the like and stores data even after the power is turned off. Note that the memory arrangement is not limited to this. For example, the image memory 505 and the RAM 504 may be shared and data backup and the like may be performed by the data accumulation unit 513. Also, although a DRAM is used as the image memory 505 in this embodiment, another storage medium such as a hard disk, a nonvolatile memory, or the like may be used.

A data conversion unit 506 performs analysis of various formats of data and data conversion such as color conversion and image conversion. A telephone unit 507 controls a telephone line and implements communication by a telephone by processing voice data input/output via a loudspeaker unit 514. An operation unit 508 controls the signals of the operation unit 203 (FIG. 2). A GPS (Global Positioning System) 509 obtains position information such as the current latitude and longitude of the communication terminal 200. A display unit 510 electronically controls the contents to be displayed on the display unit 202 (FIG. 2) and can display various kinds of input operations, the operation status of the MFP 300, statuses, and the like.

A camera unit 511 has a function of electronically recording an image input via a lens and encoding the input image. An image captured by the camera unit 511 is stored in the data accumulation unit 513. The loudspeaker unit 514 implements a voice input or output function for the telephone function and other functions such an alarm notification function. A power supply unit 515 is a portable battery and controls power supply inside the apparatus. As power supply states, there are a dead battery state in which there is no remaining amount of power in the battery, a power off state in which the power key 204 has not been pressed, an activation state in which the apparatus has been normally activated, and a power saving state in which the apparatus has been activated but is operating in a power saving mode.

The communication terminal 200 can perform wireless communication by the WLAN. This allows the communication terminal 200 to perform data communication with another device such as the MFP 300 or the like. When performing wireless communication, data is converted into a packet, and the packet is transmitted to the other device. On the other hand, a packet received from another external device is converted back to the original data and transmitted to the CPU 502. The WLAN unit 517 is connected to the main board 501 via a bus cable 516. The WLAN unit 517 is a unit for implementing communication in compliance with a standard.

The various kinds of components (503 to 515 and 517) in the main board 501 are connected to each other via a system bus 518 which is managed by the CPU 502.

Figure 6:
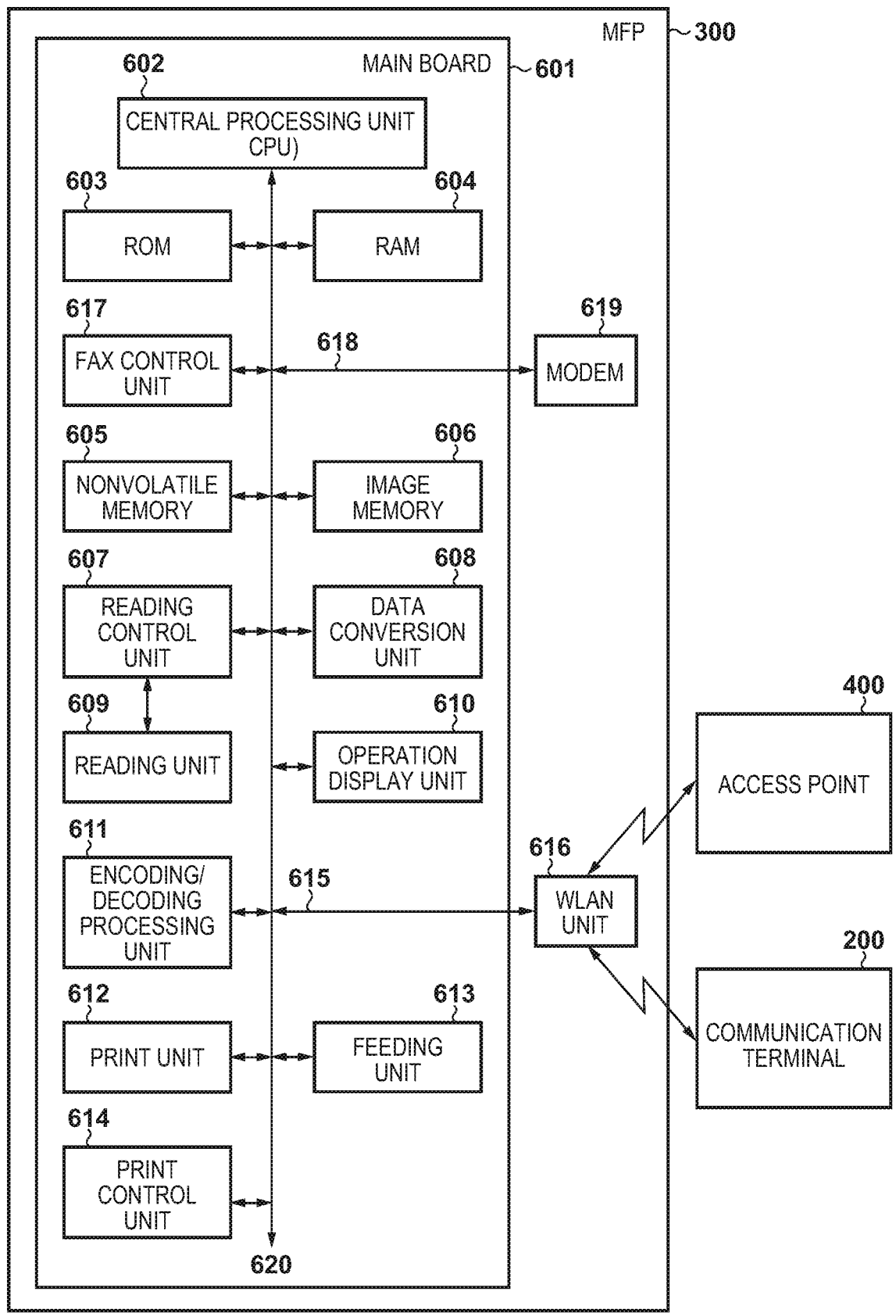
FIG. 6 is a block diagram showing an example of the arrangement of the MFP according to the present invention.

FIG. 6 is a block diagram showing an example of the arrangement of the MFP 300. The MFP 300 includes a main board 601 that executes the main control of the apparatus itself, a WLAN unit 616 that performs WLAN communication, and a modem 619 that performs analog/digital signal conversion for communication with an external device.

In the main board 601, a CPU (Central Processing Unit) 602 is a system control unit and controls the overall MFP 300. The various kinds of processing operations of the MFP 300 are executed under the control of the CPU 602. A ROM 603 stores control programs to be executed by the CPU 602, an embedded operating system (OS) program, and the like. In this embodiment, each control program stored in the ROM 603 performs software control such as scheduling, task switching, and the like under the management of the embedded OS stored in the ROM 603. A RAM 604 is formed from an SRAM (Static RAM) or the like, stores data such as program control variables, stores data such as setting values registered by the user and management data of the MFP 300, and is allocated with various kinds of work buffer areas.

A nonvolatile memory 605 is formed from a memory such as a flash memory or the like and stores data even after the power is turned off. An image memory 606 is formed from a memory such as a DRAM (Dynamic RAM) and accumulates the image data received via the WLAN unit 616 and the image data processed by an encoding/decoding processing unit 611. In the same manner as the memory arrangement of the communication terminal 200, the memory arrangement of the MFP is not limited to this. A data conversion unit 608 performs analysis of various formats of data, conversion of image data to print data, and the like.

A reading control unit 607 controls a reading unit 609 (for example, a CIS (Contact Image Sensor)) to optically read an image of a document. Next, the reading control unit outputs an image signal obtained by converting the read image into electric image data. At this time, the image data may be output after various kinds of image processing operations such as binary processing and halftone processing are performed on the image data.

An operation display unit 610 corresponds to the operation display unit 305 shown in FIG. 3. The encoding/decoding processing unit 611 performs encoding/decoding processing and resizing processing of image data (JPEG, PNG, and the like) handled by the MFP 300. A feeding unit 613 holds sheets for printing. The feeding of the sheets can be performed from the feeding unit 613 under the control of a print control unit 614. In particular, the feeding unit 613 may include a plurality of feeding units so that a plurality of types of sheets may be held in a single apparatus. Whether which feeding unit of the plurality of feeding units is to perform the feeding operation can be controlled by the print control unit 614.

The print control unit 614 performs various kinds of image processing operations, such as smoothing processing, print density correction processing, and color correction, on the image data which is to be printed, and outputs the processed image data to a print unit 612. For example, an inkjet printer that prints an image by discharging ink, which is supplied from an ink tank, from a printhead can be employed as the print unit 612. The print control unit 614 serves the role of updating the information of the RAM 604 by periodically reading out the information of the print unit 612. For example, the print control unit 614 updates the status information such as the remaining ink amount of the ink tank and the state of the printhead.

A WLAN unit 616 is incorporated in the MFP 300 in the same manner as the communication terminal 200 and has the same functions, and a description thereof will be omitted. Here, the WLAN unit 616 is connected to the main board 601 via a bus cable 615. Note that the communication terminal 200 and the MFP 300 can perform communication based on WFD and have a software access point (software AP) function. The various kinds of components (602 to 614, 616, 617, and 619) in the main board 601 are connected to each other via a system bus 620 which is managed by the CPU 602.

First Embodiment

An operation according to the embodiment which allows a user to easily select a connection destination access point when an apparatus according to the first embodiment that includes the above-described arrangement is to connect to each of access points using different frequency bandwidths will be described in detail. More specifically, in an apparatus such as a wireless router or the like that uses a plurality of frequency bandwidths, the identification names (SSIDs: Service Set Identifiers) of access points corresponding to the frequency bandwidths may be similar or the same. Also, even different apparatuses may be set with the same SSID. An operation that allows the user to easily and suitably select an access point in these cases will be described. Note that although the bandwidths of 2.4 GHz and 5 GHz will be exemplified as the plurality of frequency bandwidths, the present invention is not limited to this. Additionally, although an SSID (Service Set Identifier) will be used in this embodiment to exemplify a piece of predetermined information that may overlap among the access points, the present invention is not limited to this, and another piece of information (identification information) may be used.

FIGS. 7A to 7D are views showing examples of display screens of the operation display unit 305 of the MFP 300 in FIG. 3.

Figure 7A:
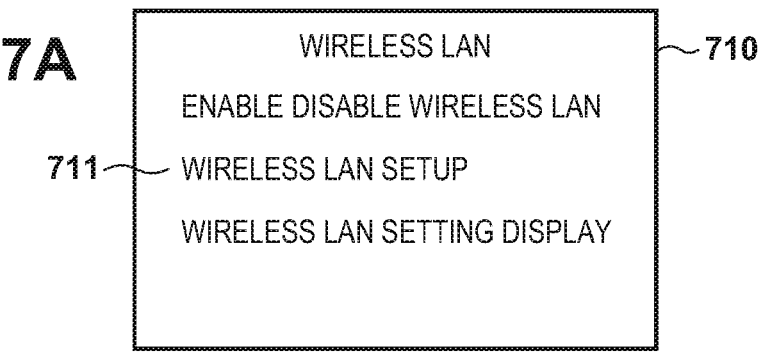
FIGS. 7A, 7B, 7C, and 7D are views each showing an example of the display screen at the execution of a wireless LAN setup according to the present invention.
Figure 7B:
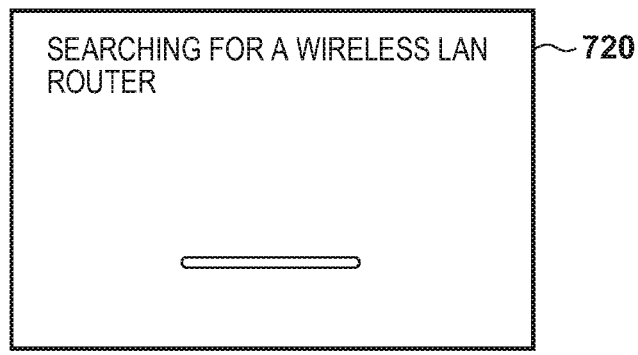
Figure 7C:
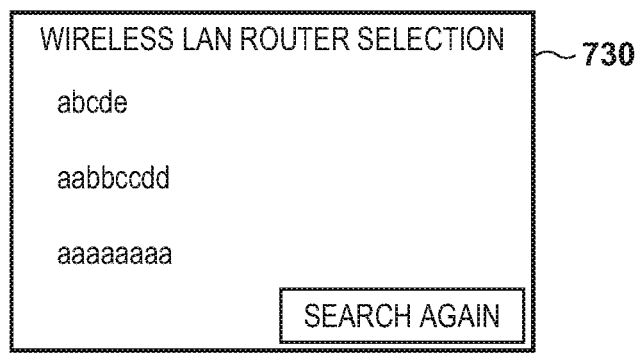
Figure 7D:
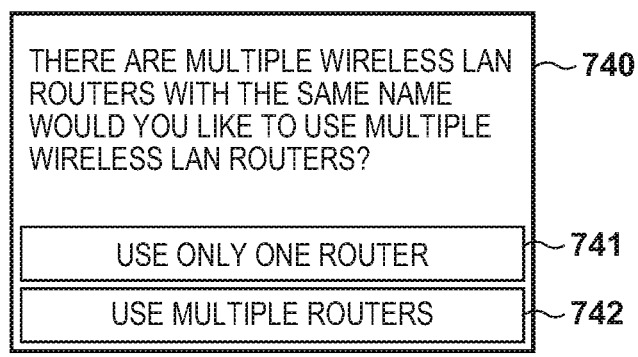

A screen 710 shown in FIG. 7A is an example of the arrangement of a screen to which the display changes after a wireless LAN 431 is selected on the screen 430 shown in FIG. 4C, and the screen 710 is a screen in which wireless LAN setting change can be executed. A screen 720 shown in FIG. 7B is an example of the arrangement of a screen which is displayed when a wireless setup 711 is selected on the screen 710, and the screen 720 is displayed while an access point search is being performed. A screen 730 shown in FIG. 7C is an example of the arrangement of a screen to display, as an access point search result, a list of the identification names (SSIDs) of the access points. A screen 740 shown in FIG. 7D is an example of the arrangement of a screen which is displayed when an access point whose identification name (SSID) overlaps with that of another access point is selected from the search result list shown on the screen 730. Options "use only one router" 741 and "use multiple routers" 742 are provided on the screen 740. From this setting, an instruction for a setting to display the MAC addresses of the individual access points to allow the user to select a specific access point and that for a setting to allow connection from a plurality of access points under a predetermined condition can be made. The "use only one router" 741 is set when a plurality of access points that have the same identification name (SSID) are present and a specific one of the access points is to be designated. The "use multiple routers" 742 is set when a plurality of access points that have the same identification name (SSID) are present and an access point that matches a predetermined condition is to be automatically selected from the plurality of access points. This embodiment will describe, as the predetermined condition, an example in which an access point with the highest intensity is selected based on the radio frequency intensity of the access point. However, the present invention is not limited to this.

Figure 8A:
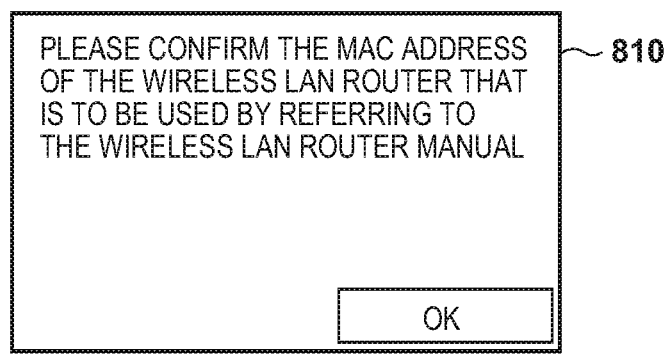
FIGS. 8A and 8B are views each showing an example of the display screen.
Figure 8B:
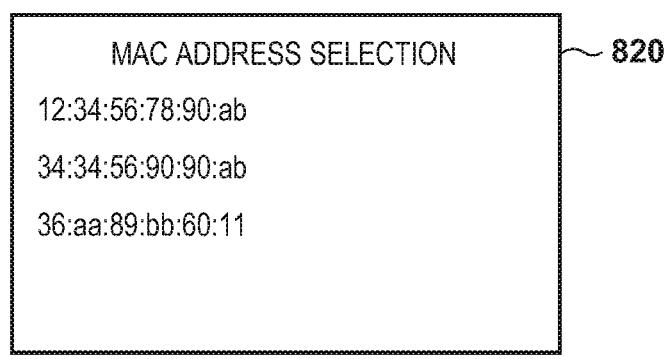

FIGS. 8A and 8B are views showing examples of display screens which are shown when the "use only one router" 741 on the screen 740 shown in FIG. 7D has been selected, and the setting to display the MAC addresses of the individual access points and cause the user to select an access point has been executed. A screen 810, shown in FIG. 8A, shows an example of the arrangement of a warning screen that prompts the user to confirm the MAC address of the desired connection destination access point. A screen 820, shown in FIG. 8B, shows an example of the arrangement of a screen displaying a list of the MAC addresses of the individual access points.

Figure 9A:
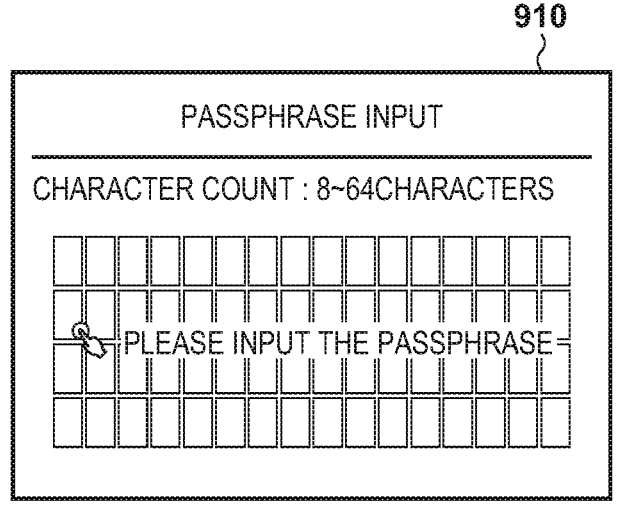
FIGS. 9A, 9B, and 9C are views each showing an example of the display screen.
Figure 9B:
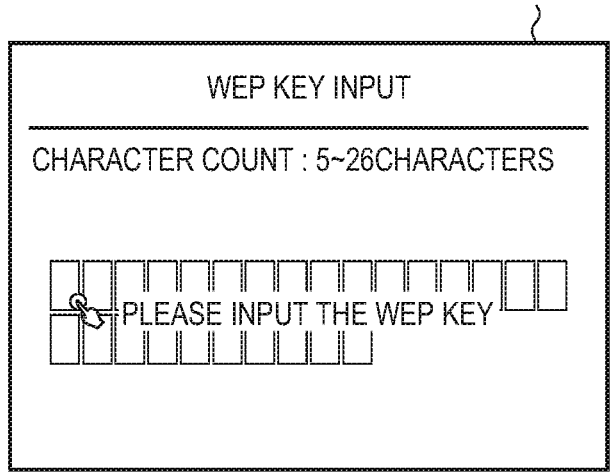
Figure 9C:
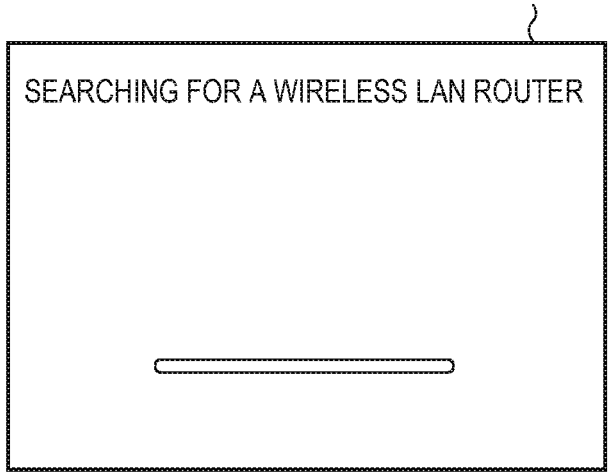

FIGS. 9A to 9C are views showing examples of display screens when the "use multiple routers" 742 has been selected in the screen 740 in FIG. 7D and the setting to allow connection from a plurality of access points under a predetermined condition has been executed.

A screen 910, shown in FIG. 9A, shows an example of the arrangement of a screen which is displayed for the user to input a passphrase (authentication information) when WPA2 is the authentication method of the connection destination access point which was selected under the predetermined condition. A screen 920, shown in FIG. 9B, shows an example of the arrangement of a screen which is displayed for the user to input a passphrase (WEP key) when WEP is the encryption method of the connection destination access point which was selected under the predetermined condition. A screen 930, shown in FIG. 9C, shows an example of the arrangement of a screen which is displayed when the connection to the selected access point is started after the passphrases of the screens 910 and 920 have been input. Each passphrase is a piece of authentication information that is requested at the time of connection to the access point, and the character count of each passphrase is defined in accordance with each method. In a case in which the connection destination access point, which has been selected under the predetermined condition, does not have an authentication method setting, the screen 930 is displayed without displaying the screens 910 and 920. Note that the above-described authentication methods are merely examples, and other authentication methods may be used.

Processing Procedure

FIG. 10 is a flowchart showing the details of screen change performed when the wireless LAN setup described in FIGS. 7A to 9C is selected. When the "wireless LAN setup" 711 is selected in the screen 710 shown in FIG. 7A, the MFP 300 executes the following processing. The following processing is implemented by, for example, the CPU 602 reading out a program stored in the ROM 603 or the like and executing the readout program.

In step S1001, the MFP 300 executes a search for an access point that uses the frequency of 2.4 GHz. Normally, an access point periodically and simultaneously transmits a packet called a beacon, and the beacon reception result is used as the result in the access point search. As the beacon information, for example, information such as the SSID, the authentication method, the encryption method, and the radio field intensity are included as shown in FIG. 15. Note that a conventional technique is used with respect to the beacon, and a detailed description will be omitted here.

In step S1002, the MFP 300 stores the search result obtained in step S1001 in the RAM 604. If not a single access point could be detected as the result of the search, this information is stored in the RAM. Note that, from the search executed in step S1001, the SSID, the MAC address, and the radio field intensity from the access point are obtained from each access point that has been detected by the search. The search result stored in step S1002 includes the obtained SSID and radio field intensity of each access point.

In step S1003, the MFP 300 executes a search for an access point that uses the frequency of 5 GHz. The search executed in this step is executed in the same manner as that executed in step S1001.

In step S1004, the MFP 300 stores the search result obtained in step S1003 in the RAM 604. As the result of the search, if not even a single access point could be detected, this information is stored in the RAM. Note that, from the search executed in step S1003, the SSID, the MAC address, and the radio field intensity from the access point are obtained from each access point that has been detected by the search. The search result stored in step S1004 includes the obtained SSID and radio field intensity.

In step S1005, the MFP 300 executes sorting in accordance with the predetermined condition based on the stored search results. The MFP 300 displays the screen 720 shown in FIG. 7B while the processes of steps S1001 to S1005 are performed. The details of this process will be described later with reference to FIGS. 11 to 14.

In step S1006, the MFP 300 displays the result of the sorting processing performed in step S1005 on the operation display unit 305 in the manner of the screen 730 shown in FIG. 7C. In addition, the MFP 300 accepts the selection of an access point which is to be the connection destination from the list displayed on the operation display unit 305.

In step S1007, the MFP 300 determines whether the identification name (SSID) of the access point that has been selected in step S1006 is overlapping. In this embodiment, in a case in which the identification name (SSID) of the access point is overlapping with another access point, the access points are summarized and displayed as a single group in a list by grouping processing (to be described later). Hence, here, it is determined whether the selected access points have been made into a single group by grouping. If it is determined that there is an overlap (YES in step S1007), the process advances to step S1008. Otherwise (No in step S1007), the process advances to step S1011.

In step S1008, the MFP 300 displays the "use only one router" 741 and the "use multiple routers" 742 options (buttons) on the operation display unit 305 in the manner of the screen 740 shown in FIG. 7D. The "use only one router" 741 is a setting for displaying and selecting the MAC addresses of the individual access points. The "use multiple routers" 742 is a setting to allow connection from a plurality of access points under a predetermined condition. Upon accepting the selection of one of the options, the MFP 300 determines whether the "use only one router" 741 has been selected. If the "use only one router" 741 has been selected (YES in step S1008), the process advances to step S1010. If the "use multiple routers" 742 has been selected (NO in step S1008), the process advances to step S1009.

In step S1009, the MFP 300 selects, from the selected access points with overlapping identification names (SSIDs), an access point that has the highest radio field intensity. At this time, the pieces of information of the radio field intensities stored in steps S1002 and S1004 are used as a reference. Subsequently, the process shifts to step S1011.

In step S1010, the MFP 300 displays, on the operation display unit 305, the MAC addresses of the selected individual access points with overlapping identification names (SSIDs) in the order of the radio field intensity in the manner of the selection screen 820 shown in FIG. 8B. At this time, the MFP refers to the radio field intensities and the MAC addresses stored in steps S1002 and S1004. The MFP 300 accepts the selection of a MAC address from the list, and the process subsequently shifts to step S1011.

In step S1011, the MFP 300 determines whether there is an encryption/authentication method designation in the selected access point. If there is an encryption/authentication method designation (YES in step S1011), the process advances to step S1102. Otherwise (NO in step S1011), the process advances to step S1013.

In step S1012, the MFP 300 displays, on the operation display unit 305, each passphrase input screen (the screen 910 in FIG. 9A or the screen 920 in FIG. 9B) corresponding to the encryption method or the authentication method. The MFP 300 accepts each passphrase via the displayed input screen. Subsequently, the process advances to step S1013.

In step S1013, the MFP 300 starts connecting to the designated access point. Here, if a passphrase has been accepted, the passphrase is used at the execution of the connection processing.

In step S1014, the MFP 300 determines whether connection to the access point has been completed normally. If the connection has been completed normally (YES in step S1014), this processing procedure ends. Otherwise (NO in step S1014), the process advances to step S1015.

In step S1015, the MFP 300 notifies the user of the error via the operation display unit 305. Subsequently, this processing procedure ends. Note that in a case in which connection to the access point has failed due to an input of an incorrect passphrase, the process may return to step S1012 and be repeated again. In such a case, this processing procedure may end after the connection has failed as a result of executing a predetermined number of attempts to establish the connection.

FIG. 11 is a flowchart showing the details of the access point search result sorting processing executed in step S1005 in FIG. 10.

In step S1101, the MFP 300 reads out the pieces of information which are stored as the access point search result in the RAM 604.

In step S1102, the MFP 300 sorts the readout pieces of information in the descending order of radio field intensity based on the predetermined condition. The details of the processing of this step will be described later with reference to FIG. 12.

In step S1103, the MFP 300 executes member association/registration processing in which access points with overlapping identification names (SSIDs) are associated with each other. The details of the processing of this step will be described later with reference to FIG. 13.

In step S1104, the MFP 300 executes grouping of the entire search result by putting access points that have overlapping identification names (SSIDs) into a single group. The details of the processing of this step will be described later with reference to FIG. 14. Subsequently, this processing procedure ends, and the process advances to step S1006 in FIG. 10.

Figure 12:
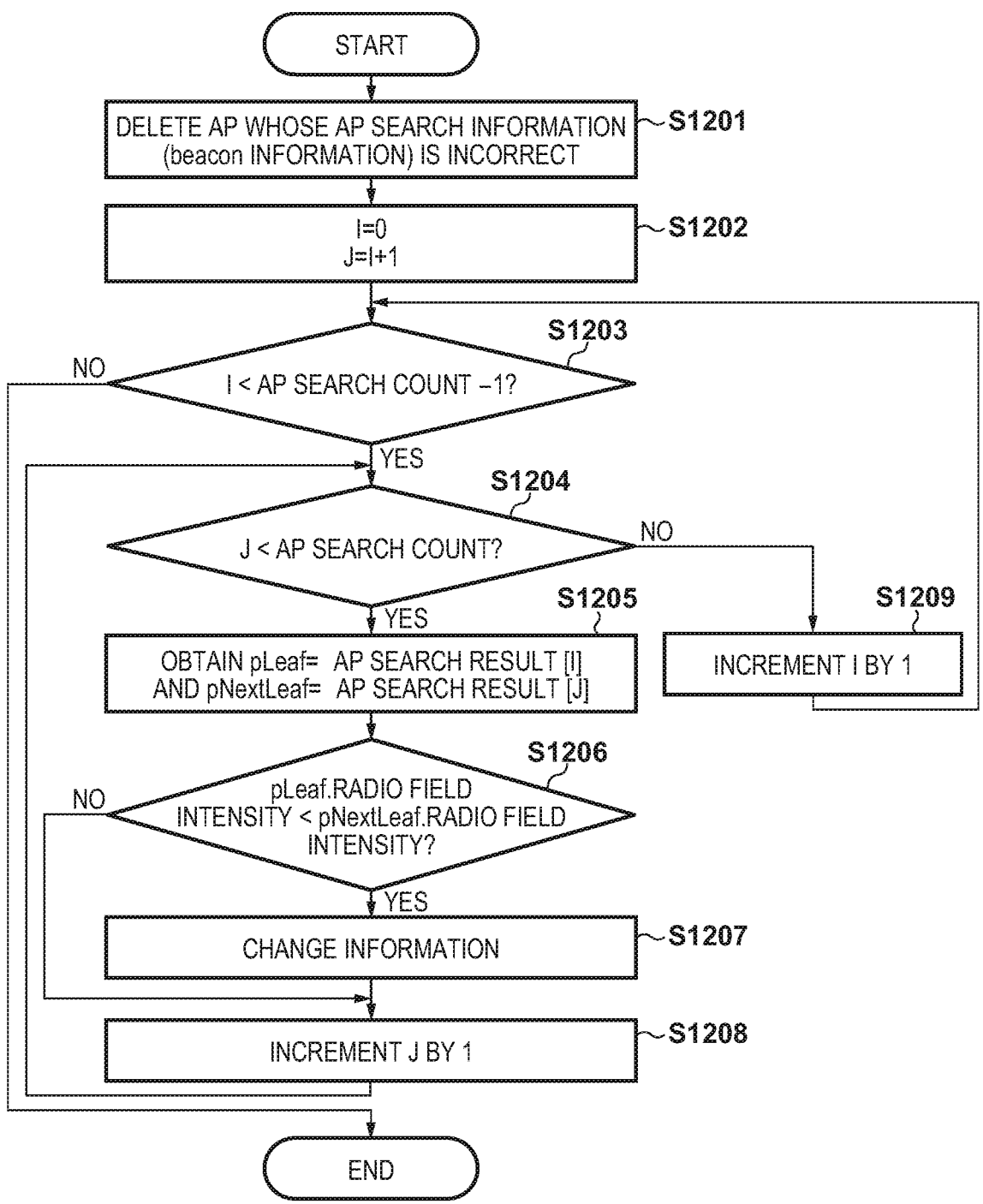
FIG. 12 is a flowchart showing radio field intensity order sorting processing according to the present invention.

FIG. 12 is a flowchart showing the details of the processing related to sorting performed based on the radio field intensity order in the process of step S1102 in FIG. 11.

In step S1201, the MFP 300 deletes, among pieces of information obtained in step S1101 of FIG. 11, each piece of information indicating that connection is impossible due to reasons such as the occurrence of a breakdown and the like. This piece of information here corresponds to beacon information such as that in FIG. 15. The number of the pieces of information after the deletion will be described as an "AP search count" hereinafter. In addition, if the information is to be handled as an array, it is described as an "AP search result [X]", and the AP search result [X] indicates, for example, the Xth value in the array.

In the processes of steps S1202 to S1209, the MFP 300 sorts the valid search results in the descending order of the radio field intensity. Note that as the sequence of the sorting processing, the MFP performs a general processing operation of sorting the array data sets by a predetermined standard. An example of such processing operation will be described more specifically below.

In step S1202, the MFP 300 initializes a variable I to "0". Also, I+1 is substituted into a variable J by the MFP 300.

In step S1203, the MFP 300 determines whether "I<(AP search count) −1" is established. If it is established (YES in step S1203), the process advances to step S1204. Otherwise (NO in step S1203), this processing procedure ends.

In step S1204, the MFP 300 determines whether "J<(AP search count)" is established. If it is established (YES in step S1204), the process advances to step S1205. Otherwise (NO in step S1204), the process advances to step S1209.

In step S1205, the MFP 300 obtains the information of an AP search result [I] and the information of an AP search result [J]. Here, the address of the AP search result [I] is substituted into a variable pLeaf and the address of the AP search result [J] is substituted into a variable pNextLeaf to refer to the respective pieces of information.

In step S1206, the MFP 300 compares the radio field intensity of the AP search result [I] (that is, the variable pLeaf) and the radio field intensity of the AP search result [J] (that is, the variable pNextLeaf), and determines whether the radio field intensity of the AP search result [J] is higher. If the radio field intensity of the AP search result [J] is higher (YES in step S1206), the process advances to step S1207. Otherwise (NO in step S1206), the process advances to step S1208.

In step S1207, the MFP 300 swaps the order of the information of the AP search result [I] and the information of the AP search result [J]. That is, the information of the AP search result [J] is arranged at a higher position than the information of the AP search result [I] in the list.

In step S1208, the MFP 300 increments the value of the variable J by 1, the process returns to step S1204, and the processing is repeated.

In step S1209, the MFP 300 increments the value of the variable I by 1, the process returns to step S1203, and the processing is repeated.

A list shown in FIG. 16 is obtained when the list shown in FIG. 15 is sorted in accordance with the execution result of this processing procedure.

Figure 13:
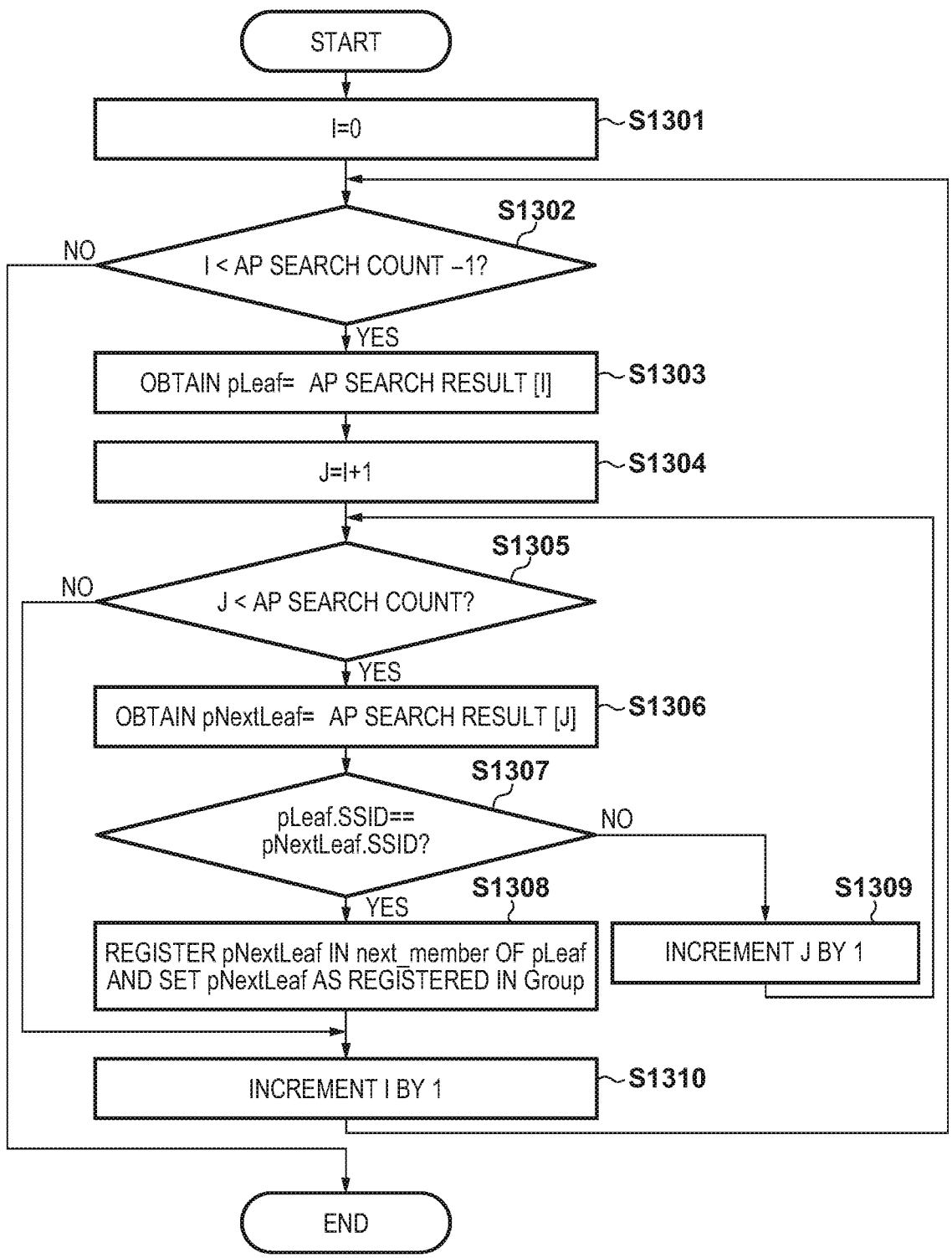
FIG. 13 is a flowchart showing member association/registration processing according to the present invention.

FIG. 13 is a flowchart showing the details of the member association/registration processing performed, in step S1103 of FIG. 11, to associate access points with overlapping identification names (SSIDs) after the sorting operation (FIG. 12) performed in accordance with the radio field intensity order. In this processing procedure, the MFP confirms, in the descending order of radio field intensity, whether the identification names (SSIDs) match in all combinations. If there is a match, the pieces of member information are associated with each other in the manner shown in FIG. 17. Note that as the sequence of the member association/registration processing, the MFP performs a general processing operation of associating the pieces of information from the array data. An example of such processing operation will be described more specifically below.

In step S1301, the MFP 300 initializes the variable I to "0".

In step S1302, the MFP 300 determines whether "I<(AP search count)−1" is established. If it is established (YES in step S1302), the process advances to step S1303. Otherwise (NO in step S1302), this processing procedure ends.

In step S1303, the MFP 300 obtains the information of the AP search result [I]. Here, the MFP refers to the information by substituting the address of the AP search result [I] into the variable pLeaf.

In step S1304, I+1 is substituted into the variable J by the MFP 300.

In step S1305, the MFP 300 determines whether "J<(AP search count)" is established. If it is established (YES in step S1305), the process advances to step S1306. Otherwise (NO in step S1305), the process advances to step S1310.

In step S1306, the MFP 300 obtains the information of the AP search result [J]. Here, the MFP refers to the information by substituting the address of the AP search result [J] into the variable pNextLeaf.

In step S1307, the MFP 300 determines whether the SSID of the AP search result [I] (that is, the variable pLeaf) and the SSID of the AP search result [J] (that is, the variable pNextLeaf) match. If they match (YES in step S1307), the process advances to step S1308. Otherwise (NO in step S1307), the process advances to step S1309.

In step S1308, the MFP 300 associates, with the AP search result [I], the AP search result [J] as a member belonging to the same group. This is processed here by registering that the AP search result [J] is a member of the same group in a variable next_member. Furthermore, the MFP 300 manages the AP search result [J] (that is, the variable pNextLeaf) as registered in the group.

In step S1309, the MFP 300 increments the value of the variable J by 1, the process returns to step S1305, and the processing is repeated.

In step S1310, the MFP 300 increments the variable I by 1, the process returns to step S1302, and the processing is repeated.

Figure 14:
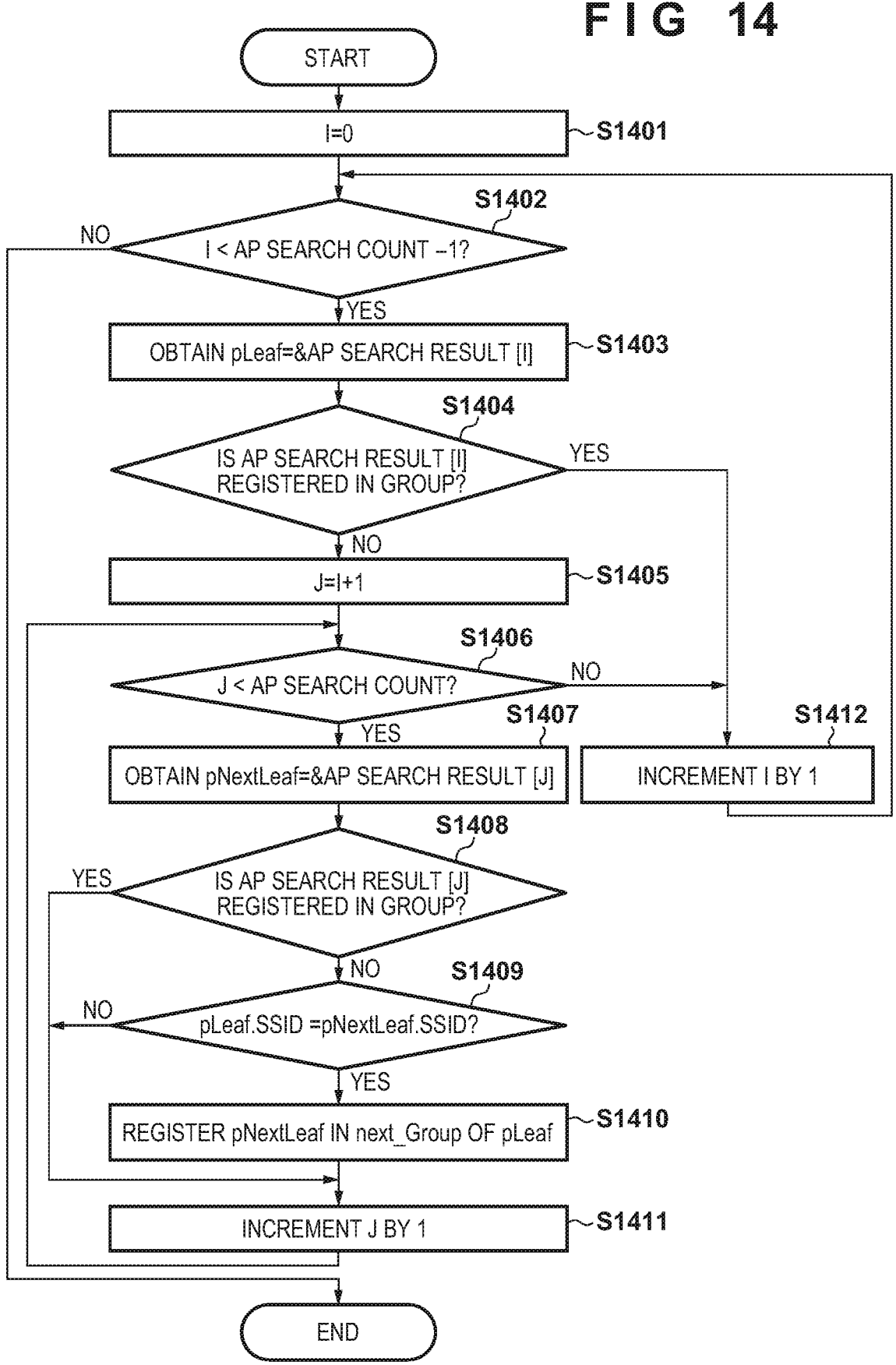
FIG. 14 is a flowchart showing grouping processing according to the present invention.

FIG. 14 is a flowchart showing the details of the grouping processing of dividing members into respective groups performed in step S1104 in FIG. 11 after the execution of the member association/registration processing (FIG. 13). In this processing procedure, each result that has not been registered as a member is divided into groups and associated. Note that as the grouping sequence, a general processing operation of creating groups from the array data will be executed. An example of such a processing operation will described more specifically below.

In step S1401, the MFP 300 initializes the variable I to "0".

In step S1402, the MFP 300 determines whether "I<(AP search count)−1" is established. If it is established (YES in step S1402), the process advances to step S1403. Otherwise (NO in step S1402), this processing procedure ends.

In step S1403, the MFP 300 obtains the information of the AP search result [I]. Here, the MFP refers to the information by substituting the address of the AP search result [I] into the variable pLeaf.

In step S1404, the MFP 300 determines whether the AP search result [I] (that is, the variable pLeaf) is registered in a group. Whether the AP search result [I] has been registered is determined based on whether it was registered in the process of step S1308 in FIG. 13. If the AP search result [I] is registered (YES in step S1404), the process advances to step S1412. Otherwise (NO in step S1404), the process advances to step S1405.

In step S1405, the MFP 300 substitutes I+1 into the variable J.

In step S1406, the MFP 300 determines whether "J<(AP search count)" is established. If it is established (YES in step S1406), the process advances to step S1407. Otherwise (NO in step S1406), the process advances to step S1412.

In step S1407, the MFP 300 obtains the information of the AP search result [J]. Here, the MFP refers to the information by substituting the address of the AP search result [J] into the variable pNextLeaf.

In step S1408, the MFP 300 determines whether the AP search result [J] (that is, the variable pNextLeaf) is registered in a group. If the AP search result [J] is registered (YES in step S1408), the process advances to step S1411. Otherwise (NO in step S1408), the process advances to step S1409.

In step S1409, the MFP 300 determines whether the SSID of the AP search result [I] (that is, the variable pLeaf) and the SSID of the AP search result [J] (that is, the variable pNextLeaf) match. If they do not match (YES in step S1409), the process advances to step S1410. Otherwise (NO in step S1409), the process advances to step S1411.

In step S1410, the MFP 300 registers the AP search result [J] in a group different from that of the AP search result [I]. This is processed here by registering that the AP search result [J] belongs to a different group in a variable next_Group. Subsequently, the process advances to step S1411.

In step S1411, the MFP 300 increments the value of the variable J by 1, the process returns to step S1406, and the processing is repeated.

In step S1412, the MFP 300 increments the value of the variable I by 1, the process returns to step S1402, and the processing is repeated.

From the processing operations of FIGS. 11 to 14 as described above, the access point search results are sorted in the radio field intensity order, and access points with overlapping identification names (SSIDs) are grouped together. As a result, in a case in which the access point search result is to be displayed on the operation display unit 305 of the MFP 300 in the manner of the screen 730 shown in FIG. 7C, access points with overlapping SSIDs are summarized and displayed in the descending order of the radio field intensity. In addition, access points with overlapping identification names (SSIDs) can be displayed as a single access point. Since SSIDs have been divided into groups in the order of "abcde", "aabbccdd", and "aaaaaaaa" in accordance with the radio field intensity order in FIG. 17, the respective SSIDs are displayed according to this order on the screen 730 shown in FIG. 7C.

Note that in FIGS. 13 and 14, not only in cases in which the same SSID has been determined, but also similar SSIDs may be included in the same group by determining, for example, whether the SSIDs are similar to each other. In a similarity determination method, for example, if two SSIDs have the same character count or a character count difference between the two SSIDs is equal to or smaller than a predetermined value, and if the ratio of the inclusion of a same character is equal to or larger than a predetermined value, the two SSIDs are determined to be similar to each other.

For example, a wireless router that supports a plurality of frequency bandwidths may be set with character strings such as "-2G" or "-5G" ("-" indicates the same character string) may be set as SSIDs corresponding to the respective frequency bandwidths. In this case, when the similarity determination is performed as described above, two SSIDs corresponding to the two frequency bandwidths supported by the same wireless router may be registered in the same group.

Also, if the SSID similarity determination is to be performed in the manner described above, in step S1006, only one of the plurality of SSIDs in the same group may be displayed or only the common character string among the plurality of SSIDs may be displayed. In the latter case, for example, if the two SSIDs of "-2G" or "-5G" ("-" indicates the same character string) as described have been registered in the same group, only the "-" portion of one SSID is displayed.

Figure 17:
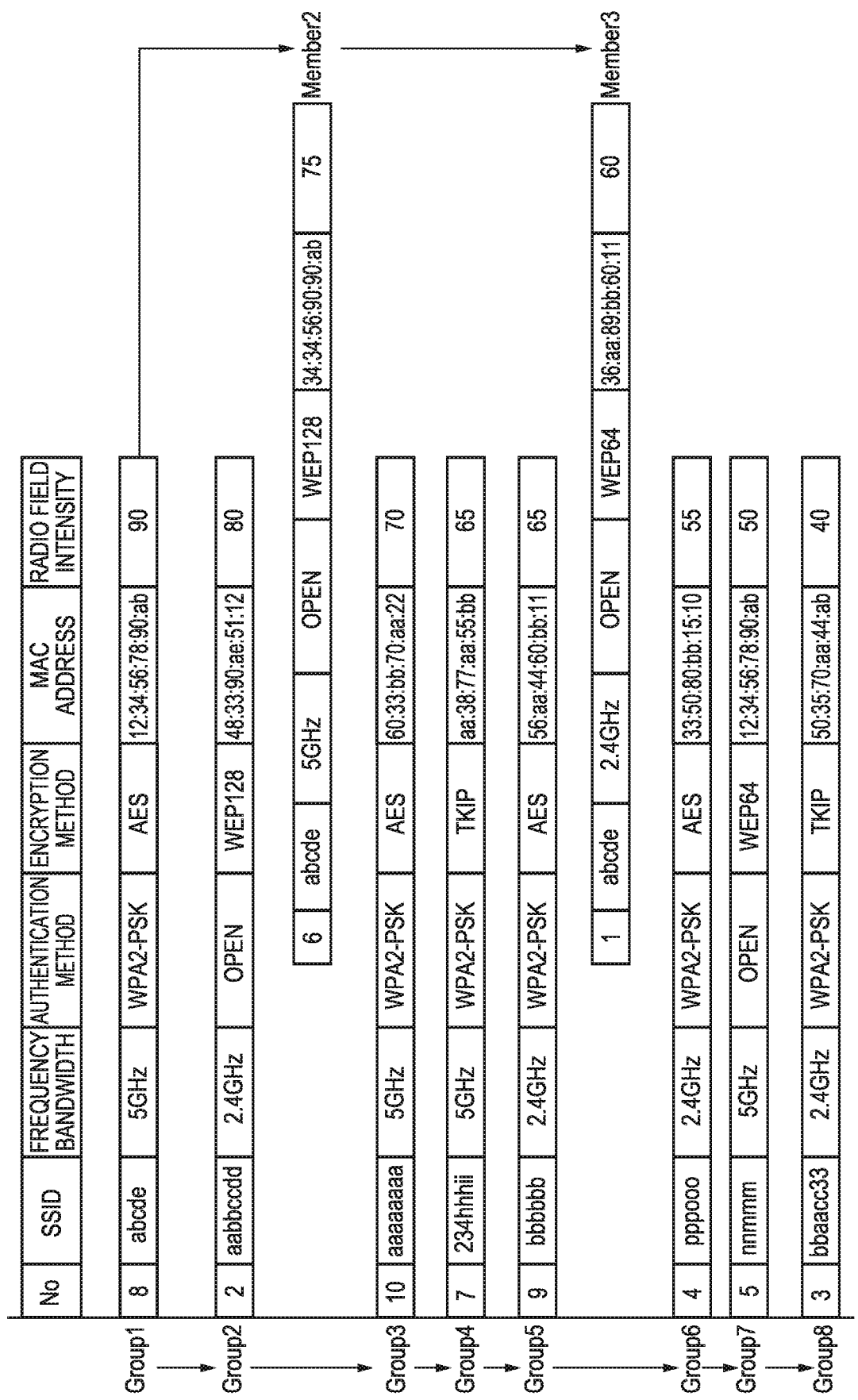
FIG. 17 is a view showing groupings of wireless access point search results according to the present invention.

When access points with overlapping identification names (SSIDs) are selected on the screen 730, it is possible to display the corresponding pieces of MAC address information, in accordance with the radio field intensity order, on the operation display unit 305 of the MFP 300 as in the manner of the screen 820 shown in FIG. 8B. In FIG. 17, the access points with the SSID "abcde" are overlapping, and the radio field intensities of these access points have been registered as members in the order of 90, 75, and 60. Hence, on the screen 820 shown in FIG. 8B, the MAC addresses ("12:34:56:78:90:ab", "34:34:56:90:90:ab", and "36:aa:89:bb:60:11") of the respective access points are displayed in accordance with this order.

As described above, according to the arrangement of this embodiment, in a case in which search operations for access points of different frequency bandwidths such as 2.4 GHz and 5 GHz are simultaneously executed and the obtained access points have the same identification name (SSID), it is possible to preferentially make a connection with an access point that has the highest radio field intensity.

Note that the above description illustrated an example in which the MFP 300 uses the radio field intensity as the condition to automatically select an access point (AP) with a higher communication quality among the plurality APs with the same identification name (SSID). However, the present invention is not limited to this, and various kinds of conditions may be used. For example, it may be set so that an AP which has a smaller noise influence is automatically selected as the AP with the higher communication quality. This allows the MFP to automatically connect to an AP with which higher quality communication can be performed. As a noise influence measurement method, various kinds of methods can be used. For example, the SNR (Signal-to-Noise Ratio) in the communication operation of each of the plurality of APs may be obtained by a known method, and it may be set so that the MFP will connect to an AP that has a higher SNR.

An AP that does not have a DFS (Dynamic Frequency Selection) function may be prioritized over an AP that has the DFS function. A plurality of frequencies (channels) are present in a frequency bandwidth corresponding to 5 GHz as a frequency bandwidth of the wireless LAN. Even among the plurality of channels, a specific channel may be used as weather radar or the like, and the radio fields of the wireless LAN communication need to avoid interfering with the radar. Hence, there is an AP that has a function (the above-described DFS function) of automatically changing channels to avoid the aforementioned specific channel when the radar is detected. However, if the MFP is connected to an AP that has this DFS function, temporary communication disconnection may frequently occur since automatic channel changes will be performed. Therefore, instead of an AP that has the DFS function, an AP that does not have the DFS function and does not use the aforementioned specific channel among the plurality of channels of the 5-GHz frequency bandwidth may be preferentially selected. If information as to whether the AP has the DFS function or information of a channel to be used in the 5-GHz frequency bandwidth is referred to if such pieces of information can be obtained from the AP at the time of the AP search. Alternatively, a search can be executed by the plurality of channels included in the 5-GHz frequency bandwidth at the time of the AP search. An AP may be automatically selected by prioritizing, instead of an AP detected in the aforementioned specific channel, an AP detected in a channel other than the aforementioned specific channel as the AP with the higher communication quality.

The communication speeds of the plurality of APs may be measured, and an AP whose measured communication speed is higher may be automatically selected as the AP with the higher communication quality. For example, predetermined information (an ACK frame or the like) may be transmitted to each of the plurality of APs with the same SSIDs, and an AP with the shorter transmission-to-reception time may be automatically selected.

Furthermore, the AP with the higher communication quality may be automatically selected based on the combination of the reception radio field intensity from an AP and the frequency bandwidth used to detect the AP. For example, when it is possible to use the 2.4-GHz frequency bandwidth and the 5-GHz frequency bandwidth, the 5-GHz frequency bandwidth will be preferentially selected. For example, in a case in which the reception radio field intensity of an AP detected in the 5-GHz frequency bandwidth is equal to or higher than a predetermined value, this AP is automatically selected. Alternatively, even in a case in which the reception radio field intensity of an AP detected in the 2.4-GHz frequency bandwidth is higher than the reception radio field intensity of the AP detected in the 5-GHz frequency bandwidth, if their difference is equal to or lower than a predetermined value, the AP detected in the 5-GHz frequency bandwidth is automatically selected. Alternatively, an AP with the higher reception radio field intensity may be automatically selected by weighting the reception radio field intensities of APs detected in the 5-GHz frequency bandwidth and comparing them with the reception radio field intensities of APs detected in the 2.4-GHz frequency bandwidth.

In addition, in a case in which a plurality of APs with the same SSIDs have been detected, the selection of an AP with which the MFP is to perform the connection processing is not limited to a selection under relative conditions by comparing the radio field intensities, the communication speeds, the SNRs, and the like of the APs. For example, if an AP1 has been detected in the 5-GHz frequency bandwidth, and if an absolute condition in which the radio field intensity, the communication speed, or the SNR is equal to or higher than a predetermined value is satisfied, the AP1 may be selected regardless of the radio field intensity, the communication speed, or the SNR of another AP2. In a case in which the AP1 does not satisfy the above-described absolute condition, determination can be made based on conditions relative to the AP2.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154733, filed Aug. 9, 2017, which is hereby incorporated by reference herein in its entirety.

What is claimed is:

1. A wireless communication apparatus capable of wireless communication, comprising:
   a search unit configured to search, by using a plurality of frequency bandwidths, for an access point to perform wireless communication;
   a display unit configured to display, based on pieces of identification information corresponding to a plurality of access points detected by a search by the search unit and obtained from the search, display items on a display device, in accordance with an order corresponding to pieces of quality information related to communication quality in wireless communication with the plurality of access points; and
   a processing unit configured to perform, when a user selects one of the plurality of display items, connection processing to an access point specified by the selection of the display item,
   wherein the display unit displays one display item with respect to both of a first access point and a second access point which are indicated by predetermined identification information and another display item corresponding to a third access point indicated by other identification information,
   in a case where the another display item corresponding to the third access point is selected by the user, the processing unit performs the connection processing to the third access point,
   in a case where the one display item is selected by the user, the processing unit performs the connection processing to an access point that satisfies a predetermined condition based on the pieces of quality information, among the first access point and the second access point, and
   in a case where the communication quality with the third access point is lower than the communication quality with the first access point and is higher than the communication quality with the second access point, the display unit displays the display item corresponding to both of the first access point and the second access point with higher priority in the order than the another display item corresponding to the third access point.

2. The apparatus according to claim 1, wherein the predetermined condition is a condition relative to a piece of information related to the communication quality of wireless communication with the first access point and a piece of quality information related to the communication quality of wireless communication with the second access point.

3. The apparatus according to claim 1, wherein the pieces of quality information related to the communication quality are pieces of information related to radio field intensity.

4. The apparatus according to claim 3, wherein the processing unit performs connection processing to an access point, among the first access point and the second access point, which has higher radio field intensity.

5. The apparatus according to claim 1, wherein the quality information related to the communication quality is information related to noise in wireless communication.

6. The apparatus according to claim 1, wherein the pieces of quality information related to the communication quality are pieces of information related to channel change in wireless communication.

7. The apparatus according to claim 1, wherein the pieces of quality information related to the communication quality are pieces of information related to communication speed in wireless communication.

8. The apparatus according to claim 1, wherein in a case in which the first access point is detected by using a first frequency bandwidth of the plurality of frequency bandwidths and the second access point is detected by using a second frequency bandwidth, of the plurality of frequency bandwidths, lower than the first frequency bandwidth, the processing unit performs the connection processing so as to prioritize the first access point detected by using the first frequency bandwidth.

9. The apparatus according to claim 1, wherein the pieces of information related to the communication quality corresponding the first access point and the second access point are obtained by the search for the first access point and the second access point by the search unit which is performed before the display by the display unit, and
   the processing unit performs, based on the pieces of quality information related to the communication quality obtained by the search, the connection processing to the access point that satisfies the predetermined condition among the first access point and the second access point.

10. The apparatus according to claim 1, wherein the identification information is a Service Set Identifer (SSID).

11. The apparatus according to claim 10, wherein the search unit performs detection by obtaining a beacon transmitted periodically by an access point.

12. The apparatus according to claim 10, wherein the display unit displays the display items indicating the pieces of identification information of the plurality of access points.

13. The apparatus according to claim 1, further comprising:
   an accepting unit configured to accept an instruction by the user when the display item displayed by the display unit is selected,
   wherein when the accepting unit accepts a first instruction, the processing unit performs the connection processing to the access point that satisfies the predetermined condition among the first access point and the second access point.

14. The apparatus according to claim 13, wherein when the accepting unit accepts a second instruction, the accepting unit displays a selection screen for selecting a connection-destination access point among the first access point and the second access point, and
   the processing unit performs the connection processing to the access point selected, via the selection screen, among the first access point and the and the second access point.

15. The apparatus according to claim 14, wherein the accepting unit displays the selection screen which includes a MAC address of the first access point and a MAC address of the second access point.

16. The apparatus according to claim 15, wherein the MAC address of the first access point and the MAC address of the second access point are obtained by the search for the first access point and the second access point by the search unit which was performed before the display by the display unit.

17. The apparatus according to claim 1, wherein the plurality of frequency bandwidths include 5 GHz and 2.4 GHz.

18. The apparatus according to claim 1, wherein the communication apparatus is a printing apparatus.

19. A communication method of a communication apparatus capable of wireless communication, the method comprising:

searching, by using a plurality of frequency bandwidths, for an access point to perform wireless communication;

displaying, based on pieces of identification information corresponding to a plurality of access points detected by a search in the searching and obtained from the search, display items on a display device, in accordance with an order corresponding to pieces of quality information related to communication quality in wireless communication with the plurality of access points; and performing, when a user selects one of the plurality of display items, connection processing to an access point specified by the selection of the display item, wherein one display item with respect to both of a first access point and a second access point which are indicated by predetermined identification information and another display item corresponding to a third access point indicated by other identification information are displayed on the display device, in a case where the another display item corresponding to the third access point is selected by the user, the connection processing to the third access point is performed, in a case where the one display item is selected by the user, the connection processing is performed to an access point that satisfies a predetermined condition based on the pieces of quality information, among the first access point and the second access point, and in a case where the communication quality with the third access point is lower than the communication quality with the first access point and is higher than the communication quality with the second access point, the display item corresponding to both of the first access point and the second access point is displayed with higher priority in the order than the another display item corresponding to the third access point is displayed.

20. A non-transitory computer-readable medium storing a program to cause a computer capable of wireless communication to function as a search unit configured to search, by using a plurality of frequency bandwidths, for an access point to perform wireless communication;

a display unit configured to display, based on pieces of identification information corresponding to a plurality of access points detected by a search by the search unit and obtained from the search, display items on a display device, in accordance with an order corresponding to pieces of quality information related to communication quality in wireless communication with the plurality of access points; and a processing unit configured to perform, when a user selects one of the plurality of display items, connection processing to an access point specified by the selection of the display item, wherein the display unit displays one display item with respect to both of a first access point and a second access point which are indicated by predetermined identification information and another display item corresponding to a third access point indicated by other identification information, in a case where the another display item corresponding to the third access point is selected by the user, the processing unit performs the connection processing to the third access point, in a case where the one display item is selected by the user, the processing unit performs the connection processing to an access point that satisfies a predetermined condition based on the pieces of quality information, among the first access point and the second access point, and in a case where the communication quality with the third access point is lower than the communication quality with the first access point and is higher than the communication quality with the second access point, the display unit displays the display item corresponding to both of the first access point and the second access point with higher priority in the order than the another display item corresponding to the third access point.

* * * * *